United States Patent [19]

Andrié et al.

[11] Patent Number: 4,509,263
[45] Date of Patent: Apr. 9, 1985

[54] LASER SENSING MEANS FOR DIMENSIONAL CONTROL PURPOSES

[75] Inventors: Philippe Andrié, Longpont s/Orge; Jacques Mimeur, Veyrier du Lac, both of France

[73] Assignee: Commissariat a l'Energie Atomique, Paris, France

[21] Appl. No.: 515,580

[22] Filed: Jul. 20, 1983

[30] Foreign Application Priority Data

Jul. 29, 1982 [FR] France .............................. 82 13241

[51] Int. Cl.³ .............................................. G01B 7/28
[52] U.S. Cl. .................................. 33/169 R; 33/174 L
[58] Field of Search ............ 33/169 R, 172 E, 174 L, 33/143 L, DIG. 4, DIG. 21; 356/375, 383, 357, 358

[56] References Cited

U.S. PATENT DOCUMENTS

| | | | |
|---|---|---|---|
| 3,183,597 | 5/1965 | Donaldson et al. | 33/169 R |
| 3,596,362 | 8/1971 | Reason | 33/174 L |
| 4,120,093 | 10/1978 | Spies | 33/174 L |
| 4,255,862 | 3/1981 | Nakamura | 33/174 L |
| 4,261,107 | 4/1981 | Coleman et al. | 33/174 L |

FOREIGN PATENT DOCUMENTS

| | | | |
|---|---|---|---|
| 2943431 | 4/1980 | Fed. Rep. of Germany | 33/174 L |
| 2191097 | 2/1974 | France | 33/174 L |
| 2289878 | 5/1976 | France | 33/174 L |
| 2396954 | 2/1979 | France | 33/174 L |
| 2425623 | 12/1979 | France | 33/174 L |
| 299742 | 6/1954 | Switzerland | 33/172 E |
| 2085390 | 4/1982 | United Kingdom | 33/174 L |

Primary Examiner—Willis Little
Attorney, Agent, or Firm—Oblon, Fisher, Spivak, McClelland & Maier

[57] ABSTRACT

Laser sensing means for dimensional control purposes comprising a laser sensing means, wherein it comprises a body, a sensor sliding in the body, a counterweight weighing the same as the sensor and connected to the latter by a wire passing over pulleys and sliding in the body parallel to the sensor, translation guidance means for the sensor and the counterweight, means for exerting a pressure on the sensor and means for measuring the sensor displacement.

8 Claims, 1 Drawing Figure

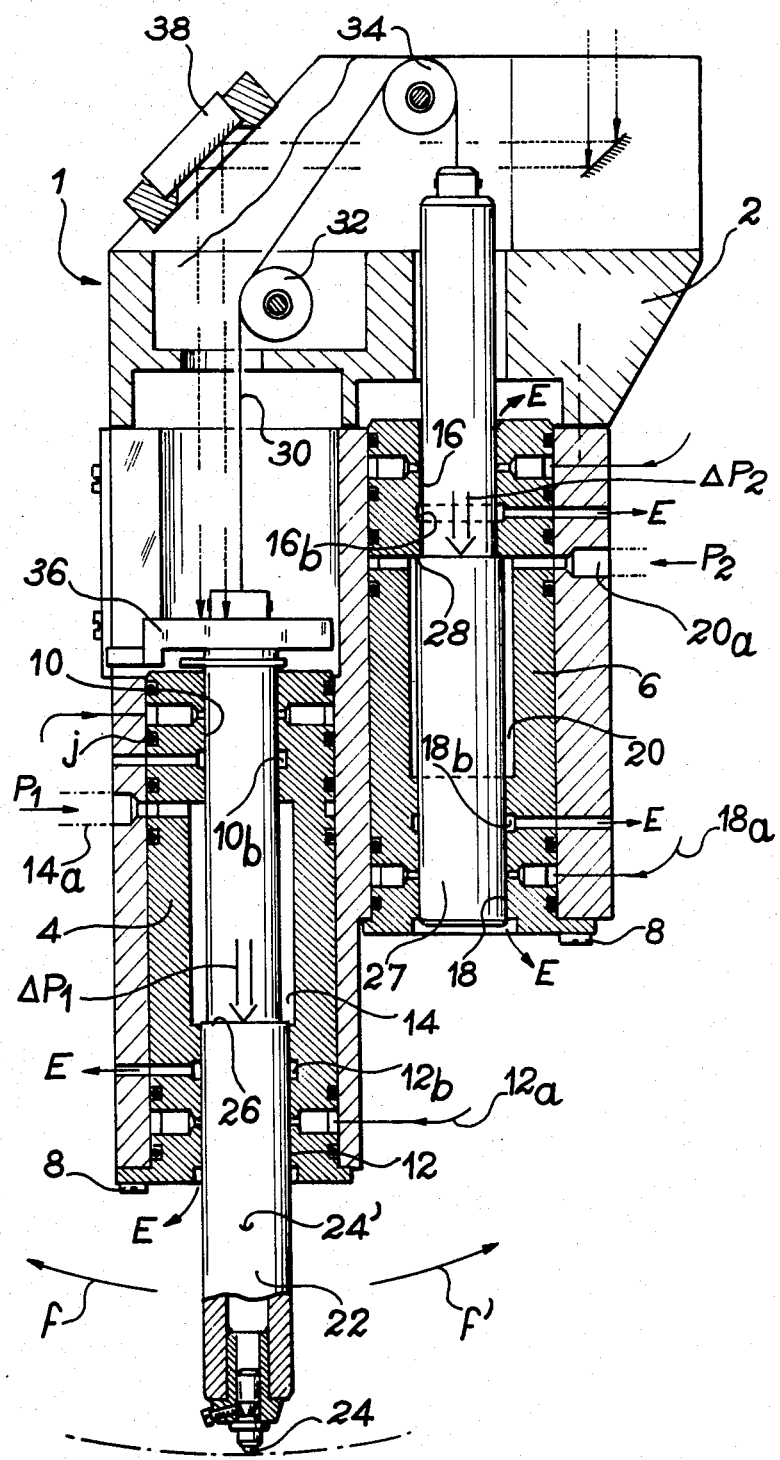

4,509,263

LASER SENSING MEANS FOR DIMENSIONAL CONTROL PURPOSES

BACKGROUND OF THE INVENTION

The present invention relates to a laser sensing means for dimensional control purposes.

Means for controlling or testing the profile of a part using a sensor are already known for the purpose of inspecting parts having an irregular shape. A machine of this type comprises a sensor mounted at the end of a sensor carrying arm and means for displacing said arm, in order that the sensor can follow the profile of the part to be inspected.

Dimensional measurements of the profile of hollow axially symmetrical parts are carried out on machines having two orthogonal plates, namely a vertically axed plate supporting the part to be inspected and a horizontally axed plate supporting the measuring head, which can be equipped with one or two sensing devices.

If it is desired to obtain an accuracy of measurement of approximately 1 micron, and bearing in mind the geometry of the parts and the nature of the materials, the sensing means must satisfy a number of different criteria. Its travel must be up to 30 mm, the sensing pressure must remain low and constant no matter what the position of the sensor in space, it must be insensitive to radial stresses and it is finally desirable for its overall dimensions to be as small as possible.

No prior art sensing means is able to satisfy all these different requirements. Accurate sensing means have large dimensions, their sensing force varies and is also several dozen grams. Conversely, the sensing means having an adequate travel or stroke and reduced overall dimensions do not permit precise measurements and are not insensitive to radial stresses.

SUMMARY OF THE INVENTION

The invention relates to a sensing means satisfying all the requirements referred to hereinbefore.

The present invention more specifically relates to a sensing means, wherein it comprises a body, a sensor sliding in the body, a counterweight weighing the same as the sensor and connected to the latter by a wire passing over pulleys and sliding in the body parallel to the sensor, translation guidance means for the sensor and the counterweight, means for exerting a pressure on the sensor and means for measuring the sensor displacement.

Preferably, the guidance means are constituted by pneumatic bearings.

Preferably, the means for exerting a sensing pressure on the sensor are constituted by shoulders on the sensor and the counterweight and by chambers within which there is a compressed gas pressure, the surface of the sensor shoulder being larger than the surface of the counterweight shoulder.

Finally, the means for measuring the displacement of the sensor are constituted by a measuring mirror integral with the upper end of the sensor, and by a laser beam, incorporating an arm of an interferometer, directed onto the mirror and means for counting the interference fringes.

DESCRIPTION OF THE DRAWING AND THE PREFERRED EMBODIMENTS

The invention is described in greater detail hereinafter relative to non-limitative embodiments and with reference to the attached drawing in the form of a sectional view of the sensing means according to the invention.

The sensing means 1 according to the invention comprises a body 2 made e.g. from a light alloy, in which are formed two cylindrical bores having parallel axes. These bores contain sleeves 4 and 6, each of which has a collar in its lower part in order to fix the same to the body 2, e.g. by means of screws 8. The sleeve 4 has two bores 10 and 12 separated by a chamber 14. In the same way, sleeve 6 has two bores 16 and 18 located in the extension of one another and separated by a chamber 20. It should be noted that the diameter of bores 12 and 18 is larger than the diameter of bores 10 and 16 respectively. Compressed air supply pipes issue at each of the bores 10, 12, 16, 18, in order to form per se, known air bearings. The air bearings are sealed by gaskets j. Pneumatic pipes 14a and 20a issue into chambers 14 and 20 respectively. Finally, in each of the four bores, there is a cylindrical groove 10b, 12b, 16b, 18b. Each of these grooves is placed underatmospheric pressure by a radial duct pierced into the corresponding sleeve and in body 2. Within the sleeve 4, there is a sensor 22, whereof the end or touch point, is in contact with the part to be controlled, tested or inspected. Sensor 22 is in the form of an elongated rod, which slides with a clearance of bores 10 and 12. As can be seen, sensor 22 has two parts with different diameters connected by a shoulder 26. The surface of this shoulder is one of the characteristics of the sensor because, as will be shown hereinafter, the sensing pressure is dependent thereon. In an exemplified embodiment, the surface of shoulder 26 is 0.345 cm$^2$.

In the same way, counterweight 27 is in the form of an elongated rod, which slides with clearance in sleeve 6. Counterweight 27 has two parts having different diameters, connected by a shoulder 28. The surface of shoulder 28, like that of shoulder 26, is a feature of the sensor. In the represented embodiment, said surface is 0.294 cm$^2$.

The weight of sensor 22 is balanced by that of counterweight 27. Thus, these two parts are connected by a metal wire 30, which passes over two pulleys 32, 34 mounted on body 2.

A mirror 36 is fixed to sensor 22, whilst another mirror 38, inclined by 45° relative to the axis of sensor 22, is fixed to body 2. These two mirrors make it possible to reflect the beam of a laser used for measuring the displacement of the sensor. A Hewlett Packard 5501 laser associated with an interferometer is suitable for this measurement.

The travel of the sensor is given by the length of chambers 14 and 20. The drawing shows the sensor in its position of maximum extension. In this position, shoulder 28 of the counterweight is in contact with the upper wall of chamber 20. Reference numeral 24' designates the maximum retraction position of end 24. The distance between these two positions correspond to the capacity of the sensor.

The sensing pressure is given by surfaces $S_1$ and $S_2$ of shoulders 26, 28 and by the compressed gas pressure supplied by pipes 14a and 20a, which prevail in chambers 14 and 20. These pressures can be identical or different. In the present embodiment, $s_1 = 0.345$ cm$^2$, $s_2 = 0.294$ cm$^2$, $s_1 - s_2 = \Delta = 0.051$ cm$^2$.

For a control pressure between 0.1 and 0.2 bar, the resulting force applying sensor 22 to the part to be inspected is between 0.5 and 0.10N, i.e. approximately 5 to 10 g.

The sensor according to the invention can pivot by 180° in accordance with arrows f and f', on either side of the position shown in the drawing. If $\theta$ is the angle of the axis of sensor 22 with the horizontal, starting from an angle $\theta = 90°$ corresponding to a horizontal position of the sensor, pressure p (assumed to be identical in chambers 14 and 20) must at least be equal to $(P/S) \times \cos \cdot \theta$. In this formula, P designates the weight of sensor 22 and that of counterweight 27 (which are equal) and S the useful section of the counterweight. Thus, it is as from this pressure P that wire 30 connecting the sensor to the counterweight is taut. In the described embodiment, p=0.0272 kg and s=0.294 cm². Under these conditions, for $\theta = 180°$ (contact point of sensor 2 at the top), pressure p in chambers 14 and 20 must at least be equal to 0.092 bar. When the end 24 of the sensor is applied to an oblique surface with respect to the sensor axis, a contact action directed perpendicularly to the axis of the sensor is exerted on the latter. In order that the measurements are not falsified, it is necessary for the sensor to have a considerable rigidity at the sensing point. This is on the one hand dependent on the spacing of the air bearings and on the other on the rigidity of each of these bearings. In the presently described embodiment, the lateral displacement of the sensing point has been evaluated, i.e. the touch point 24, as 0.019 $\mu$m with the sensor extended and 0.008 $\mu$m with the sensor retracted.

With regards to the compressed air consumption, it is pointed out that the sensor and the counterweight function as jointless jacks. The leak in the circular groove is:

$$M = \frac{(p_1 - p_2)\pi D \cdot e^3}{24 n r t l}$$

In this formula, M is the mass flow in kg/s, $p_1$ and $p_2$ absolute pressures upstream and downstream in $P_a$, D the diameter of the slot in m, e the width of the slot in m, rT=constant=86400, l the slot length in m and $\eta$ the dynamic viscosity of the air in Pl.

In the case where the pressure in chambers 14 and 20 is 0.2 bar, the following leakage flows are obtained:
0.034 l/min for groove 16b (diameter 10 mm),
0.035 l/min for groove 10b (diameter 10.3 mm),
0.041 l/min for grooves 12b and 18b, whose diameter is 12 mm.

Thus, the total compressed air flow rate is 0.151 l/min.

The sensing means is supplied with air as from an input pressure of 5 to 6 bars. This air is expanded in a regulating pressure reducer to a pressure of 2 bars and is then filtered in a 0.1$\mu$ filter. The air is then expanded to the supply pressure, which can vary from 0 to 0.2 bar, with a sensitivity of 0.03 millibar.

What is claimed is:

1. A sensing device having a body, first and second parallel bores in said body, a sensor slidably fitted in said first bore, and guided therein by pneumatic bearings, a counter weight having the same weight as the sensor, slidably fitted in said second bore and guided therein by pneumatic bearings, first and second pulleys pivotedly fitted on said body, a wire passing over said first and second pulleys, and connecting the sensor to the counterweight, means for exerting a pressure on the sensor, means for measuring the sensor displacement, wherein said body has an annular chamber surrounding the sensor, said annular chamber being connected to a pressure source, a shoulder in the sensor, a second annular chamber in said body, said second annular chamber surrounding said counterweight, and being connected to a second pressure source, a shoulder in said counterweight, the surface of the sensor shoulder being larger than the surface of the counterweight shoulder.

2. A sensing device according to claim 1, wherein the means for measuring the displacement of the sensor includes a measuring mirror, integral with the upper end of the sensor.

3. A sensing device comprising:
   (a) a body having first and second parallel bores therein, said first bore opening to the exterior of said body at one end thereof and passing through a first interior chamber in said body, said second bore passing through a second interior chamber in said body;
   (b) first means for communicating a selectable fluid pressure to said first interior chamber;
   (c) second means for communicating a selectable fluid pressure to said second interior chamber;
   (d) a sensor slidable received in pneumatic bearings in said first bore, said sensor being sized and positioned such that one end thereof protrudes from said one end of said first bore and such that it passes through said first interior chamber and is slidably received in said first bore on either side of said first interior chamber over the full extent of the travel of said sensor during use of the sensing device, said sensor having a first shoulder which is located in said first interior chamber over the full extent of the travel of said sensor during use of the sensing device, said first shoulder being oriented such that a fluid pressure communicated to said first interior chamber by said first means acts on said sensor in the direction toward said one end of said sensors:
   (e) a counterweight slidably received in pneumatic bearings in said second bore, said counterweight having the same weight as said sensor and being sized and positioned such that it passes through said second interior chamber and is slidably received in said second bore on either side of said second interior chamber over the full extent of the travel of said counterweight during use of the sensing device, said counterweight having a second shoulder which is located in said second interior chamber over the full extent of the travel of said counterweight during use of the sensing device, said second shoulder being smaller in effective area than said first shoulder and being oriented such that a fluid pressure communicated to said second interior chamber by said second means acts on said counterweight in a direction parallel to the direction in which a fluid pressure communicated to said first interior chamber by said first means acts on the said sensor;
   (f) first and second pulleys mounted on said body in position such that a wire which is connected at its opposite ends to said sensor and said counterweight and which is trained over said first and second pulleys exerts only axial forces on said sensor and said counterweight; and
   (g) third means for measuring the axial displacement of said sensor in said first bore.

4. A sensing device as recited in claim 3 wherein said third means comprises a mirror mounted on and movable with said sensor.

5. A sensing device as recited in claim 3 wherein both ends of said first bore open to the exterior of said body.

6. A sensing device as recited in claim 5 wherein both ends of said second bore open to the exterior of said body.

7. A sensing device as recited in claim 3 wherein both ends of said second bore open to the exterior of said body.

8. A sensing device as recited in claim 3 wherein said first and second pulleys are mounted on the exterior of said body.

* * * * *